United States Patent
Jiang et al.

(10) Patent No.: US 11,453,812 B2
(45) Date of Patent: Sep. 27, 2022

(54) SATURATED SALT WATER DRILLING FLUID OF SALT RESPONSE TYPE INTELLIGENT POLYMER AND PREPARATION METHOD THEREOF

(71) Applicant: China University of Petroleum (Beijing), Beijing (CN)

(72) Inventors: Guancheng Jiang, Beijing (CN); Yinbo He, Beijing (CN); Lili Yang, Beijing (CN); Tengfei Dong, Beijing (CN); Xiaohu Quan, Beijing (CN); Kai Wang, Beijing (CN); Chunyao Peng, Beijing (CN); Xuwu Luo, Karamay (CN); Bin Tan, Beijing (CN); Jun Cai, Beijing (CN); Xing Liang, Beijing (CN); Zhiliang You, Beijing (CN); Yong Wang, Beijing (CN)

(73) Assignee: China University of Petroleum (Beijing), Beijing (CN)

( * ) Notice: Subject to any disclaimer, the term of this patent is extended or adjusted under 35 U.S.C. 154(b) by 0 days.

(21) Appl. No.: 17/317,406

(22) Filed: May 11, 2021

(65) Prior Publication Data
US 2021/0348046 A1     Nov. 11, 2021

(30) Foreign Application Priority Data

May 11, 2020   (CN) .......................... 202010394406.8

(51) Int. Cl.
| | | |
|---|---|---|
| *C09K 8/24* | (2006.01) | |
| *C09K 8/14* | (2006.01) | |
| *C09K 8/16* | (2006.01) | |

(52) U.S. Cl.
CPC ................ *C09K 8/24* (2013.01); *C09K 8/145* (2013.01); *C09K 8/16* (2013.01)

(58) Field of Classification Search
CPC ............. C09K 8/24; C09K 8/16; C09K 8/145
See application file for complete search history.

(56) References Cited

U.S. PATENT DOCUMENTS

| | | |
|---|---|---|
| 6,124,245 A | 9/2000 | Patel |
| 2011/0308799 A1 | 12/2011 | Ak et al. |
| 2016/0272869 A1 | 9/2016 | Singh et al. |

FOREIGN PATENT DOCUMENTS

| | | | |
|---|---|---|---|
| CN | 1149070 A | | 5/1997 |
| CN | 101429427 A | | 5/2009 |
| CN | 103113862 A | | 5/2013 |
| CN | 104312557 A | | 1/2015 |
| CN | 104403645 A | | 3/2015 |
| CN | 104893690 | * | 9/2015 |
| CN | 104893690 A | | 9/2015 |
| CN | 105623627 A | | 6/2016 |
| CN | 105670576 A | | 6/2016 |
| CN | 108659801 A | | 10/2018 |
| CN | 109097009 A | | 12/2018 |
| CN | 109266318 A | | 1/2019 |
| CN | 107556990 | * | 7/2019 |
| CN | 110016324 A | | 7/2019 |
| CN | 110452670 A | | 11/2019 |
| CN | 110684514 | * | 1/2020 |
| WO | 2013138156 A1 | | 9/2013 |
| WO | 2016032578 A1 | | 3/2016 |
| WO | WO 2016/032578 | * | 3/2016 |

OTHER PUBLICATIONS

Document, Drilling, Completion & Workover Fluids 2015, page F11, downloaded on Oct. 4, 2021.*
Ma Xiping et al., "Evaluation and Action Mechanism of Heat-Resistant Filtrate Reducer-PAASD Used in Drilling Fluids," Petrochemical Technology, No. 04, pp. 453-460, Apr. 15, 2016. (English abstract attached).
Jiang Guancheng et al., A saturated saltwater drilling fluid based on salt-responsive polyampholytes, "Petroleum exploration and development" vol. 46, No. 02; Apr. 23, 2019 pp. 401-406.

* cited by examiner

*Primary Examiner* — Kumar R Bhushan
(74) *Attorney, Agent, or Firm* — Calfee Halter & Griswold LLP

(57) ABSTRACT

The invention relates to the field of drilling fluid, in particular to a saturated salt water drilling fluid of salt response type intelligent polymer and preparation method thereof. The drilling fluid contains two or more of the following components stored in admixture or separately: bentonite, NaOH, KCl, calcium carbonate, barite, NaCl, supramolecular fluid loss additive, supramolecular shear-enhancing agent, plugging agent, coating agent and water. The drilling fluid provided by the invention has the characteristics of salt response and self-assembly, can keep rheological properties such as rapid recovery of the sheared structure, low extreme high shear rate viscosity, good shear dilution property and the like in a high-salt environment, has good fluid loss reduction performance, reservoir protection performance and debris dispersion inhibition performance, and has good temperature resistance and pollution resistance performance.

11 Claims, 1 Drawing Sheet

SATURATED SALT WATER DRILLING FLUID OF SALT RESPONSE TYPE INTELLIGENT POLYMER AND PREPARATION METHOD THEREOF

CROSS REFERENCE TO RELATED APPLICATIONS

This application claims priority to Chinese Application No. 202010394406.8, filed on May 11, 2020, entitled "Saturated salt water drilling fluid of salt response type intelligent polymer and preparation method thereof", which is specifically and entirely incorporated by reference.

FIELD OF THE INVENTION

The invention relates to the field of drilling fluid, in particular to a saturated salt water drilling fluid of salt response type intelligent polymer and preparation method thereof.

BACKGROUND OF THE INVENTION

In order to relieve the external dependence of oil and gas which is continuously rising in China, the exploration and development of unconventional and other complex oil and gas resources has been increased. The existing water-based drilling fluid technology can generally meet the requirements of safe and efficient drilling of complex oil and gas reservoirs. After more than 50 years of development, the polymer drilling fluid have played a great role in improving the mechanical drilling speed, reducing underground complex conditions or accidents and the like, but the problems of poor rheological property, insufficient salt resistance and the like still exist, and the realization of the "cost reduction and efficiency improvement" goal is seriously influenced.

At present, the common method for improving the shearing and diluting characteristics of the drilling fluid is to adopt a linear high molecular polymer treating agent as much as possible, but the high shearing rate (such as the water hole of a drill bit) can break molecular chains, destroy the characteristics of the treating agent and be irreversible.

Meanwhile, in order to improve the salt pollution resistance of the drilling fluid, most of the existing countermeasures are to introduce a strong hydration group (such as a sulfonic acid group) into the polymer molecular chain to maintain its hydration dispersion in a high-salt environment so as to realize the salt resistance. However, the method cannot fundamentally avoid the charge shielding effect of the electrolyte ions on the charged groups on the polymer molecular chains in the salt water environment, and has limited salt pollution resistance.

SUMMARY OF THE INVENTION

The invention aims to provide a novel saturated salt water drilling fluid of salt response type intelligent polymer, which not only has excellent salt response characteristics, but also has better shear recovery performance (self-assembly characteristics) and better reservoir protection performance.

In order to achieve the above object, the first aspect of the present invention provides a saturated salt water drilling fluid of salt response type intelligent polymer, which contains two or more of the following components stored in admixture or separately: bentonite, NaOH, KCl, calcium carbonate, barite, NaCl, supramolecular fluid loss additive, supramolecular shear-enhancing agent, plugging agent, coating agent and water;

the supramolecular shear-enhancing agent is selected from at least one of xanthan gum, sulfonated starch, anionic polyacrylamide and zwitterionic polyacrylamide; the supramolecular fluid loss additive contains structural unit A, structural unit B and structural unit C; the structural unit A is a structural unit with the structure shown in formula (1); the structural unit B is a structural unit with the structure shown in formula (2); the structural unit C is a structural unit with the structure shown in formula (3); the weight average molecular weight of the supramolecular fluid loss additive is 50000 to 500000;

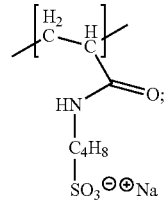

formula (1)

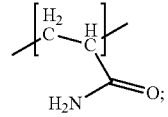

formula (2)

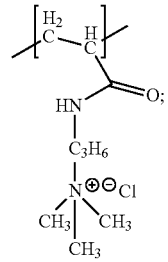

formula (3)

wherein the bentonite is contained in an amount of 1-6 parts by weight relative to 100 parts by weight of water; the content of the NaOH is 0-3 parts by weight; the content of the KCl is 0-8 parts by weight; the content of the calcium carbonate is 0-8 parts by weight; the content of the barite is 0-180 parts by weight; the content of the supramolecular fluid loss additive is 0.1-4 parts by weight; the content of the supramolecular shear-enhancing agent is 0.1-4 parts by weight; the content of the plugging agent is 2-6 parts by weight; the content of the NaCl is 0-36 parts by weight; the content of the coating agent is 0-0.8 wt %.

In the second aspect, the present invention provides a method for preparing the saturated salt water drilling fluid of salt response type intelligent polymer according to the first aspect, which method comprises: mixing the components of the drilling fluid according to the first aspect.

Compared with the prior art, the saturated salt water drilling fluid of salt response type intelligent polymer provided by the invention has at least the following advantages:

(1) the saturated salt water drilling fluid of salt response type intelligent polymer provided by the invention has excellent salt response characteristics and self-assembly characteristics, can keep the structure to be quickly recovered after shearing in a high-salt environment, and has rheological characteristics such as low extreme high shear rate viscosity, good shear dilution property and the like;

(2) the saturated salt water drilling fluid of salt response type intelligent polymer provided by the invention has good reservoir protection performance, fluid loss reduction performance, debris dispersion inhibition performance and good temperature resistance and pollution resistance performance;

(3) the saturated salt water drilling fluid of salt response type intelligent polymer provided by the invention shows excellent performance in a high-salt environment, provides a new idea for the development of salt-resistant polymers, and opens up a new direction for further improving the calcium resistance, high temperature resistance and other performances of the drilling fluid.

Additional features and advantages of the invention will be set forth in the detailed description which follows.

DETAILED DESCRIPTION OF THE EMBODIMENTS

Figure 1:
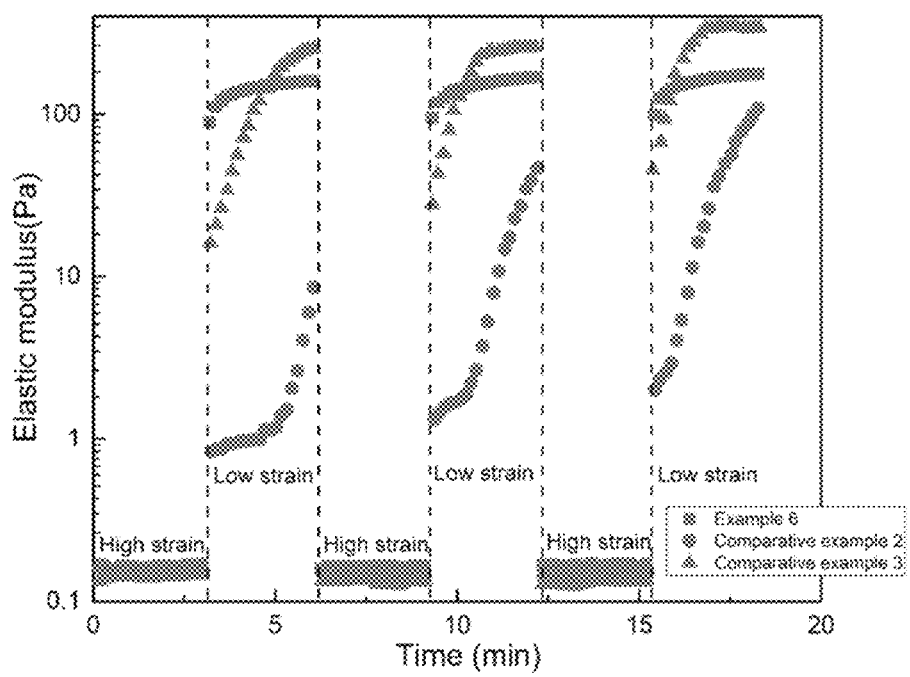
FIG. 1 is a graph comparing the results of elastic modulus during high and low strain transitions for the drilling fluids prepared in Example 6 and Comparative examples 2-3.

The endpoints of the ranges and any values disclosed herein are not limited to the precise range or value, and these ranges or values should be understood to encompass values close to these ranges or values. For numerical ranges, each range between its endpoints and individual point values, and each individual point value can be combined with each other to give one or more new numerical ranges, and such numerical ranges should be construed as specifically disclosed herein.

As described above, the first aspect of the invention provides a saturated salt water drilling fluid of salt response type intelligent polymer, which contains two or more of the following components stored in admixture or separately: bentonite, NaOH, KCl, calcium carbonate, barite, NaCl, supramolecular fluid loss additive, supramolecular shear-enhancing agent, plugging agent, coating agent and water;

the supramolecular shear-enhancing agent is selected from at least one of xanthan gum, sulfonated starch, anionic polyacrylamide and zwitterionic polyacrylamide; the supramolecular fluid loss additive contains structural unit A, structural unit B and structural unit C; the structural unit A is a structural unit with the structure shown in formula (1); the structural unit B is a structural unit with the structure shown in formula (2); the structural unit C is a structural unit with the structure shown in formula (3); the weight average molecular weight of the supramolecular fluid loss additive is 50000 to 500000;

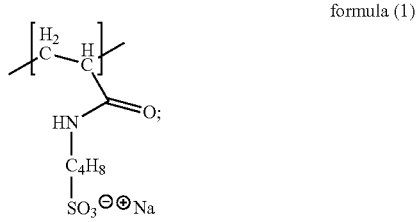

formula (1)

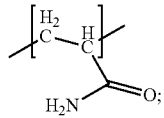

formula (2)

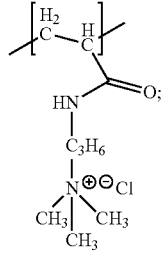

formula (3)

wherein the bentonite is contained in an amount of 1-6 parts by weight relative to 100 parts by weight of water; the content of the NaOH is 0-3 parts by weight; the content of the KCl is 0-8 parts by weight; the content of the calcium carbonate is 0-8 parts by weight; the content of the barite is 0-180 parts by weight; the content of the supramolecular fluid loss additive is 0.1-4 parts by weight; the content of the supramolecular shear-enhancing agent is 0.1-4 parts by weight; the content of the plugging agent is 2-6 parts by weight; the content of the NaCl is 0-36 parts by weight; the content of the coating agent is 0-0.8 wt %.

In the present invention, it should be noted that the water in the drilling fluid is used as a solvent, and the water can be pure distilled water and/or deionized water, or a mixed solvent containing distilled water and/or deionized water, and those skilled in the art should not be construed as limiting the present invention.

Preferably, the bentonite is contained in an amount of 1-4 parts by weight relative to 100 parts by weight of water; the content of the NaOH is 0-1.5 parts by weight; the content of the KCl is 0-5 parts by weight; the content of the calcium carbonate is 0-4 parts by weight; the content of the barite is 0-180 parts by weight; the content of the supramolecular fluid loss additive is 0.5-3.5 parts by weight; the content of the supramolecular shear-enhancing agent is 0.5-3 parts by weight; the content of the plugging agent is 2-4 parts by weight; the content of the NaCl is 0-36 parts by weight; the content of the coating agent is 0.2-0.8 wt %, so that the obtained drilling fluid has better salt response characteristic, self-assembly characteristic, better reservoir protection performance and better debris rolling recovery performance.

Preferably, in order to obtain a drilling fluid with better salt response and self-assembly properties, the content of the structural unit A in the supramolecular fluid loss additive is 5-30 wt %, based on the total weight of the supramolecular fluid loss additive; the content of the structural unit B is 40-90 wt %; the content of the structural unit C is 5-30 wt %.

Preferably, the weight average molecular weight of the supramolecular fluid loss additive is 200000 to 400000.

The source of the supramolecular fluid loss additive is not particularly limited in the present invention, and the supramolecular fluid loss additive can be obtained by being obtained commercially or by being prepared and synthesized by combining the methods provided in the known literatures in the field of organic synthesis.

Preferably, in order to obtain a drilling fluid with better reservoir protection performance, the plugging agent is selected from at least one of white asphalt, lignite and sulfonated asphalt.

Preferably, in order to obtain a drilling fluid with better salt response and self-assembly characteristics, the coating agent is selected from at least one of hydrolyzed polyacrylamide and multi-polymer emulsion coating agent.

In the present invention, the multi-polymer emulsion coating agent may be any of various known multi-polymer emulsion coating agents of two or more components, such as acrylamide/acrylic acid copolymer emulsion coating agent, acrylamide/diallyl dimethyl ammonium chloride copolymer emulsion coating agent, and acrylamide/acrylic acid/diallyl dimethyl ammonium chloride copolymer emulsion coating agent.

Preferably, the calcium carbonate has an average particle size of 1000-3000 mesh.

Preferably, the drilling fluid has a density of 1-3 g/cm$^3$.

More preferably, the drilling fluid has a density of 1.1-2 g/cm$^3$.

According to the drilling fluid of the first aspect of the invention, the following preferred embodiments are provided.

Detailed Description of the Preferred Embodiment 1

The drilling fluid contains two or more of the following components stored in admixture or separately: bentonite, NaOH, KCl, calcium carbonate, barite, NaCl, supramolecular fluid loss additive, supramolecular shear-enhancing agent, plugging agent and water;

wherein the bentonite is contained in an amount of 1-4 parts by weight relative to 100 parts by weight of water; the content of the NaOH is 0.1-1.5 parts by weight; the content of the KCl is 1-5 parts by weight; the content of the calcium carbonate is 1-4 parts by weight; the content of the barite is 0-180 parts by weight; the content of the supramolecular fluid loss additive is 0.5-3.5 parts by weight; the content of the supramolecular shear-enhancing agent is 0.5-3 parts by weight; the content of the plugging agent is 2-4 parts by weight; the content of the NaCl is 0-36 parts by weight.

Detailed Description of the Preferred Embodiment 2

The drilling fluid contains two or more of the following components stored in admixture or separately: bentonite, NaCl, supramolecular fluid loss additive, supramolecular shear-enhancing agent, plugging agent and water;

wherein the bentonite is contained in an amount of 1-4 parts by weight relative to 100 parts by weight of water; the content of the supramolecular fluid loss additive is 0.5-3.5 parts by weight; the content of the supramolecular shear-enhancing agent is 0.5-3 parts by weight; the content of the plugging agent is 2-4 parts by weight; the content of the NaCl is 0-36 parts by weight.

Detailed Description of the Preferred Embodiment 3

The drilling fluid contains two or more of the following components stored in admixture or separately: bentonite, NaOH, calcium carbonate, barite, NaCl, supramolecular fluid loss additive, supramolecular shear-enhancing agent, plugging agent, water and coating agent;

wherein the bentonite is contained in an amount of 1-4 parts by weight relative to 100 parts by weight of water; the content of the NaOH is 0.1-1.5 parts by weight; the content of the calcium carbonate is 1-4 parts by weight; the content of the barite is 0-180 parts by weight; the content of the supramolecular fluid loss additive is 0.5-3.5 parts by weight; the content of the supramolecular shear-enhancing agent is 0.5-3 parts by weight; the content of the plugging agent is 2-4 parts by weight; the content of the NaCl is 0-36 parts by weight; the content of the coating agent is 0.2-0.8 wt %.

Detailed Description of the Preferred Embodiment 4

The drilling fluid contains two or more of the following components stored in admixture or separately: bentonite, NaOH, KCl, calcium carbonate, barite, NaCl, supramolecular fluid loss additive, supramolecular shear-enhancing agent, plugging agent, coating agent and water;

wherein the bentonite is contained in an amount of 1-4 parts by weight relative to 100 parts by weight of water; the content of the NaOH is 0.1-1.5 parts by weight; the content of the KCl is 1-5 parts by weight; the content of the calcium carbonate is 1-4 parts by weight; the content of the barite is 10-180 parts by weight; the content of the supramolecular fluid loss additive is 0.5-3.5 parts by weight; the content of the supramolecular shear-enhancing agent is 0.5-3 parts by weight; the content of the plugging agent is 2-4 parts by weight; the content of the NaCl is 0.1-36 parts by weight; the content of the coating agent is 0.2-0.8 wt %.

The drilling fluids in the above preferred embodiments 1-4 have more excellent salt response, self-assembly characteristics, better reservoir protection performance and more excellent temperature and pollution resistance effects.

In the invention, the specific type and dosage of the supramolecular shear-enhancing agent and the supramolecular fluid loss additive are matched with each other in the drilling fluid system to play the unique functions of maintaining the stability of the rheological property of the system and controlling the fluid loss, and are further matched with other components in the drilling fluid system, so that the drilling fluid with stable rheological property and fluid loss property, salt response property, self-assembly property and reservoir protection property is obtained.

The saturated salt water drilling fluid of salt response type intelligent polymer provided by the invention has the characteristics of salt response and self-assembly, and can keep rheological properties such as quick recovery of the sheared structure, low extreme high shear rate viscosity, good shear dilution property and the like in a high-salt environment; it has good fluid loss reduction, reservoir protection performance and debris dispersion inhibition performance, and also has good temperature resistance and pollution resistance performance.

When the drilling fluid provided by the invention is used for field application, the drilling fluid has good rock-carrying performance and inhibition performance, can reduce the occurrence of underground complex conditions and improve the mechanical drilling speed, and can prevent the occurrence of hole diameter expansion, and has good popularization and application prospects.

As previously mentioned, the second aspect of the present invention provides a method for preparing the saturated salt water drilling fluid of salt response type intelligent polymer of the first aspect, which method comprising: mixing the components of the drilling fluid according to the first aspect.

In the second aspect of the present invention, the present invention has no particular limitation on the specific conditions of the mixing, as long as the components in the drilling fluid can be mixed sufficiently and uniformly, but in order to obtain a drilling fluid with better performance, the mixing conditions preferably include: the temperature is 20-35° C.; the time is 0.5-2 h.

In addition, the preparation method described in the present invention may further include various conventional post-treatment operations known in the art, and the present invention is not particularly limited, and may be performed by using operations conventional in the art, and those skilled in the art should not be construed as limiting the present invention.

The present invention will be described in detail below by way of examples.

In the following examples, unless otherwise specified, the experimental instruments and raw materials are commercially available.

Experimental Instruments

ZNN-6 six-speed rotary viscometer, GJS-B12K variable frequency high speed mixer, BGRL-5 roller heating furnace, LHG-3 aging kettle, 42-2A high temperature and high pressure water loss meter, ZNG-3 six-linkage medium pressure water loss meter, all purchased from Qingdao Tongchun Petroleum Instrument Limited Company; JHMD-II high-temperature and high-pressure core dynamic damage evaluation system, purchased from Jingzhou Modern Petroleum Technology Development Limited Company.

Raw Materials

Bentonite: Shandong Huawei Bentonite Co., Ltd.;

NaOH, KCl, calcium carbonate, NaCl: all are industrial grade, all purchased from ShiDaBoCheng Technology Limited Company of Beijing, wherein, unless otherwise specified, the average particle size of calcium carbonate is 2000 mesh;

Barite: purchased from Sichuan Zhengrong Industrial Co., Ltd.;

Supramolecular fluid loss additive: in the following examples, unless otherwise specified, the weight average molecular weight of the supramolecular fluid loss additive used is 360000, and the content of the structural unit A is 10 wt %; the content of the structural unit B is 80 wt %; the content of the structural unit C is 10 wt %, and the supramolecular fluid loss additive is purchased from ShiDaBoCheng Technology Limited Company of Beijing; the supramolecular fluid loss additive is an emulsion with the effective content of 30% by mass, and in the following examples, unless otherwise specified, the amount of the supramolecular fluid loss additive is the effective content;

Supramolecular shear-enhancing agent: in the following examples, unless otherwise specified, the supramolecular shear-enhancing agent used is zwitterionic polyacrylamide, purchased from ShiDaBoCheng Technology Limited Company of Beijing, under the designation E27; the supramolecular shear-enhancing agent is an emulsion with the effective content of 30% by mass, and in the following examples, the amount of the supramolecular shear-enhancing agent is the effective content unless otherwise specified;

Plugging agent: in the following examples, the plugging agent used, unless otherwise specified, is white asphalt, obtained from ShiDaBoCheng Technology Limited Company of Beijing;

Coating agent: in the following examples, the coating agent used, unless otherwise specified, is multi-polymer emulsion coating agent (acrylamide/acrylic acid copolymer emulsion coating agent), purchased from ShiDaBoCheng Technology Limited Company of Beijing, under the designation EB;

Polyanionic cellulose (PAC-LV): purchased from ShiDaBoCheng Technology Limited Company of Beijing, under the designation PAC-LV;

Salt-resistant fluid loss additive: acrylamide/2-acrylamide-2-methylpropanesulfonic acid/diallyl dimethyl ammonium chloride terpolymer, purchased from ShiDaBoCheng Technology Limited Company of Beijing, under the designation GBG;

Xanthan gum: purchased from ShiDaBoCheng Technology Limited Company of Beijing;

Sulfonated phenolic resin (SMPFL): purchased from ShiDaBoCheng Technology Limited Company of Beijing;

Temperature-resistant fluid loss additive: sodium styrene sulfonate/N-vinyl pyrrolidone/acrylamide copolymer (KTF), purchased from ShiDaBoCheng Technology Limited Company of Beijing;

Sulfonated lignite resin (SPNH): purchased from ShiDaBoCheng Technology Limited Company of Beijing.

In the following examples, the test methods for the properties involved are as follows:

1. Rheological Property Test

Rheological parameters of the drilling fluids, such as apparent viscosity (AV), plastic viscosity (PV), dynamic shear force (YP), initial and final shear (Gel 10"/10'), 6-turn and 3-turn readings ($\Phi_6/\Phi_3$), are determined by using the ZNN-6 six-speed rotary viscometer according to the oil and gas industry standard SY/T5621-1993 "Drilling fluid testing program".

Determination of shear recovery rheological properties: the shear recovery rheological properties of the drilling fluids were measured using the HAAKE rheometer (MARS60, Thermo Fisher Scientific, USA). Three cycles of shear and recovery were performed from high strain (0.1% strain) to low strain (100% strain) for 3 min each.

2. Fluid Loss Performance Test

According to the oil and gas industry standard SY/T5621-1993 "Drilling fluid testing program", the ZNG-3 six-linkage medium pressure water loss meter and the 42-2A high-temperature and high-pressure water loss meter are used for measuring the medium-pressure filtration loss FL (API) (the test temperature is 25° C., the test pressure is 0.69 MPa) and the high-temperature high-pressure filtration loss FL (HTHP) (the test temperature is the same as the corresponding aging temperature of the drilling fluid to be tested, and the test pressure is 3.5 MPa).

3. Debris Rolling Recovery Rate Test

Placing 20 g of shale debris (the particle size is 2.0-3.2 mm) into an aging tank, then adding clear water or drilling fluid into the aging tank, carrying out hot rolling in a roller heating furnace at 120° C. for 16 h, taking out the aging tank, cooling, sieving with 0.45 mm of sieve mesh, drying debris particles left on the sieve to constant weight, and calculating the hot rolling recovery rate which is the ratio of the weight of the dried debris to the weight of initial debris.

4. Anti-Pollution Performance Evaluation

Adding pollutants into the drilling fluid, fully stirring for 1 h on a high-speed stirrer, measuring the filtration loss and rheological property of the drilling fluid, and placing the drilling fluid in an aging tank, aging for 16 h in a 120° C. roller heating furnace, and measuring the filtration loss and rheological property of the drilling fluid again.

5. Reservoir Protection Performance Evaluation

The recovery value of the gas-phase permeability before and after contamination of the artificial core rock by the drilling fluid, namely the percentage of the permeability after the pollution to the permeability before the pollution, is evaluated according to SY/T 6540-2002 "Evaluation method for drilling fluid and completion fluid damage oil reservoir indoor environment".

Example 1A

The formulation of the drilling fluid is specified in Table 1;

the preparation process comprises the following steps:
mixing the components in the drilling fluid, wherein the mixing conditions comprise: the temperature is 25° C., and the time is 1 h, thus obtaining the drilling fluid Z0A #.

The remaining examples adopt a similar manner to Example 1A, except that the formulation of the drilling fluid used was different from that of Example 1A, the specific formulation is shown in Table 1, and the rest are the same as Example 1A, and the drilling fluid was prepared.

TABLE 1

|  | Example 1A | Example 1B | Example 1C | Example 1D |
|---|---|---|---|---|
| Water | 300 g | 300 g | 300 g | 300 g |
| Bentonite | 6 g | 6 g | 6 g | 6 g |
| NaOH | 1.2 g | 1.2 g | 1.2 g | 1.2 g |
| KCl | 15 g | 15 g | 15 g | 15 g |
| Calcium carbonate | 12 g | 12 g | 12 g | 12 g |
| Barite | 468 g | 438 g | 408 g | 360 g |
| Supramolecular fluid loss additive | 5.6 g | 5.6 g | 5.6 g | 5.6 g |
| Supramolecular shear-enhancing agent | 4.6 g | 4.6 g | 4.6 g | 4.6 g |
| Plugging agent | 9 g | 9 g | 9 g | 9 g |
| NaCl | 0 g | 30 g | 60 g | 108 g |
| Drilling fluid number | Z0A# | Z0B# | Z0C# | Z0D# |
| Drilling fluid density/g/cm$^3$ | 1.8 | 1.8 | 1.8 | 1.8 |

|  | Example 2 | Example 3 | Example 4 | Example 5 |
|---|---|---|---|---|
| Water | 300 g | 300 g | 300 g | 300 g |
| Bentonite | 3 g | 3 g | 6 g | 6 g |
| NaOH | 1.2 g | 1.2 g | 1.2 g | 1.2 g |
| KCl | 15 g | 15 g | 15 g | 15 g |
| Calcium carbonate | 12 g | 12 g | 12 g | 12 g |
| Barite | 81 g | 204 g | 378 g | 510 g |
| Supramolecular fluid loss additive | 2.2 g | 2.2 g | 5.6 g | 9.2 g |
| Supramolecular shear-enhancing agent | 6 g | 6 g | 4.6 g | 6.2 g |
| Plugging agent | 9 g | 9 g | 9 g | 9 g |
| NaCl | 90 g | 90 g | 90 g | 90 g |
| Drilling fluid number | Z1# | Z2# | Z3# | Z4# |
| Drilling fluid density/g/cm$^3$ | 1.3 | 1.5 | 1.8 | 2.0 |

|  | Example 6 | Example 7 | Example 8 | Example 9 |
|---|---|---|---|---|
| Water | 300 g | 300 g | 300 g | 300 g |
| Bentonite | 6 g | 3 g | 12 g | 9 g |
| NaOH | / | 1.2 g | 0.5 g | 0.5 g |
| KCl | / | 15 g | / | / |
| Calcium carbonate | / | 12 g | 9 g | 9 g |
| Barite | / | / | 280 g | 280 g |
| Supramolecular fluid loss additive | 7 g | 2.3 g | 6.2 g | 9.2 g |
| Supramolecular shear-enhancing agent | 6.2 g | 2 g | 1.6 g | 2.5 g |
| Plugging agent | 9 g | 9 g | 6 g | 9 g |
| NaCl | 90 g | 90 g | 45 g | 45 g |
| Coating agent | / | / | 0.9 g | 0.9 g |
| Drilling fluid number | Z5# | Z6# | Z7# | Z8# |
| Drilling fluid density/g/cm$^3$ | 1.19 | 1.20 | 1.55 | 1.55 |

Comparative examples 1-5 drilling fluids were prepared in a similar manner to Example 1A, except that the formulation of the drilling fluid used was different from that of Example 1A, the specific formulation being as follows, and the rest are the same as Example 1A, the specific formulation of Comparative example 1 is shown in Table 2.

TABLE 2

|  | Comparative example 1A | Comparative example 1B | Comparative example 1C | Comparative example 1D | Comparative example 1E |
|---|---|---|---|---|---|
| Water | 300 g | 300 g | 300 g | 300 g | 300 g |
| Bentonite | 6 g | 6 g | 6 g | 6 g | 6 g |
| NaOH | 1.2 g | 1.2 g | 1.2 g | 1.2 g | 1.2 g |
| KCl | 15 g | 15 g | 15 g | 15 g | 15 g |
| Calcium carbonate | 12 g | 12 g | 12 g | 12 g | 12 g |
| Barite | 468 g | 438 g | 408 g | 360 g | 378 g |
| PAC-LV | 1.6 g | 1.6 g | 1.6 g | 1.6 g | 1.6 g |
| Salt-resistant fluid loss additive | 6.2 g | 6.2 g | 6.2 g | 6.2 g | 6.2 g |
| Plugging agent | 9 g | 9 g | 9 g | 9 g | 9 g |
| NaCl | 0 g | 30 g | 60 g | 108 g | 90 g |
| Drilling fluid number | DZ0A# | DZ0B# | DZ0C# | DZ0D# | DZ0E# |
| Drilling fluid density/g/cm$^3$ | 1.8 | 1.8 | 1.8 | 1.8 | 1.8 |

Comparative Example 2 comparative drilling fluid 1# (DZ1#): 300 g of water+6 g of bentonite+1.0 g of PAC-LV+1.0 g of xanthan gum+3 g of starch+9 g of plugging agent+9 g of KCl, the density being 1.02 g/cm$^3$.

Comparative Example 3 comparative drilling fluid 2# (DZ2#): 300 g of water+6 g of bentonite+3.2 g of SMPFL (sulfonated phenolic resin)+6.2 g of KTF (temperature-resistant fluid loss additive)+6.2 g of SPNH (sulfonated lignite resin)+9 g of plugging agent, the density being 1.02 g/cm$^3$.

Comparative Example 4 comparative drilling fluid 3# (DZ3#): 300 g of water+6 g of bentonite+1.2 g of NaOH+1.6 g of PAC-LV+6.2 g of salt-resistant fluid loss additive+15 g of KCl+12 g of calcium carbonate+9 g of plugging agent+90 g of NaCl, the density being 1.20 g/cm$^3$.

Comparative Example 5 comparative drilling fluid 4# (DZ4#): 300 g of water+9 g of bentonite+6 g of SMPFL (sulfonated phenolic resin)+6.2 g of KTF (temperature-resistant fluid loss additive)+6.2 g of SPNH (sulfonated lignite resin)+12 g of plugging agent+320 g of barite, the density being 1.55 g/cm$^3$.

Comparative Example 6

In a similar manner to Example 1D, except that the formulation of the drilling fluid used was different from that of Example 1D, the drilling fluid was prepared in the same manner as in Example 1D, and the specific formulation of comparative example 6 is shown in Table 2 (Continued).

Test Example

1. Evaluation of Drilling Fluid System Salt Response

The drilling fluids prepared in the above examples were tested for the rheological and fluid loss properties after aging, respectively, and the present invention illustratively provides the test results of the following examples, particularly as shown in Table 3, with the aging conditions including: the temperature is 150° C. and the time is 16 h.

TABLE 3

| Examples | Density (g/cm$^3$) | AV (mPa·s) | PV (mPa·s) | YP (Pa) | YP/PV Pa/mPa·s | FL (API) (mL) | FL (HTHP) (mL) |
|---|---|---|---|---|---|---|---|
| Example 1A | 1.8 | 40 | 35 | 5 | 0.14 | 24.0 | 65.0 |
| Example 1B | 1.8 | 52 | 47 | 5 | 0.11 | 12.2 | 32.6 |
| Example 1C | 1.8 | 72 | 62 | 10 | 0.16 | 3.6 | 15.0 |
| Example 1D | 1.8 | 83 | 70 | 13 | 0.19 | 2.2 | 10.6 |
| Comparative example 1A | 1.8 | 73 | 60 | 13 | 0.22 | 2.6 | 11.2 |
| Comparative example 1B | 1.8 | 60 | 51 | 9 | 0.18 | 5.6 | 14.2 |
| Comparative example 1C | 1.8 | 53 | 48 | 5 | 0.10 | 11.8 | 27.8 |
| Comparative example 1D | 1.8 | 42 | 38 | 4 | 0.11 | 17.6 | 42.2 |

From the results, it can be seen that the viscosity and the dynamic shear force of the drilling fluids provided by the present invention are increased and the filtration loss is reduced along with the increase of the salt concentration, so that the drilling fluids play roles of increasing viscosity, increasing shear and reducing filtration loss, and show good salt response characteristics; the drilling fluids in the comparative examples have the characteristics that the viscosity and the shearing force of the drilling fluids are reduced, the TABLE 2(Continued)

| | Example 1D | Comparative example 6A | Comparative example 6B | Comparative example 6C | Comparative example 6D | Comparative example 6E |
|---|---|---|---|---|---|---|
| Water | 300 g | 300 g | 300 g | 300 g | 300 g | 300 g |
| Bentonite | 6 g | 6 g | 6 g | 6 g | 6 g | 6 g |
| NaOH | 1.2 g | 1.2 g | 1.2 g | 1.2 g | 1.2 g | 1.2 g |
| KCl | 15 g | 15 g | 15 g | 15 g | 15 g | 15 g |
| Calcium carbonate | 12 g | 12 g | 12 g | 12 g | 12 g | 12 g |
| Barite | 360 g | 360 g | 360 g | 360 g | 360 g | 360 g |
| Supramolecular fluid loss additive | 5.6 g | 5.6 g | 5.6 g | — | 5.6 g | 5.6 g |
| Supramolecular shear-enhancing agent | 4.6 g | — | 18 g | 4.6 g | 4.6 g (starch) | 4.6 g |
| Plugging agent | 9 g | 9 g | 9 g | 9 g | 9 g | — |
| NaCl | 108 g | 108 g | 108 g | 108 g | 108 g | 108 g |
| Drilling fluid number | Z0D# | DZ5A# | DZ5B# | DZ5C# | DZ5D# | DZ5E# |
| Drilling fluid density/g/cm$^3$ | 1.8 | 1.8 | 1.8 | 1.8 | 1.8 | 1.8 |

Note: in Table 2, the shear-enhancing agent used in Comparative example 6D was starch, purchased from ShiDaBoCheng Technology Limited Company of Beijing, under the designation DF-120.

filtration loss is increased and the performance of the drilling fluids are gradually deteriorated along with the increase of the salt concentration.

2. Performance Test of Drilling Fluids of Different Densities in High Salt Environment The rheological properties and fluid loss properties of the drilling fluids of the following examples before and after aging were respectively tested, and the specific test results are shown in Table 4.

comparative examples is obviously more than that of the drilling fluids of the invention;

from the above results, particularly the results of Example 1D and Comparative examples 6A-6E under saturated salt conditions, it can be seen that when the drilling fluid system does not contain the supramolecular shear-enhancing agent, or the supramolecular shear-enhancing agent is not at least one of xanthan gum, sulfonated starch, anionic polyacrylamide, and zwitterionic polyacrylamide, the drilling fluid

TABLE 4

| Examples | Aging conditions | Test conditions | AV (mPa·s) | PV (mPa·s) | YP (Pa) | Gel 10″/10′ | YP/PV Pa/mPa·s | FL (API) (mL) | FL (HTHP) (mL) |
|---|---|---|---|---|---|---|---|---|---|
| Example 2 1.3 g/cm³ | 80° C./16 h | Before aging | 31 | 26 | 5 | 0.5/0.5 | 0.19 | / | / |
|  |  | After aging | 30 | 25 | 5 | 0.5/1 | 0.2 | 2.6 | 8.2 |
| Example 3 1.5 g/cm³ | 150° C./16 h | Before aging | 61 | 49 | 12 | 1/2 | 0.24 | / | / |
|  |  | After aging | 43 | 39 | 4 | 0.5/1 | 0.10 | 2.0 | 8.6 |
| Example 4 1.8 g/cm³ | 150 °C./16 h | Before aging | 99 | 79 | 20 | 5/12 | 0.25 | / | / |
|  |  | After aging | 77 | 65 | 12 | 2/9 | 0.18 | 1.8 | 12.2 |
| Example 5 2.0 g/cm³ | 150°C/16 h | Before aging | 92 | 76 | 16 | 3/10 | 0.21 | / | / |
|  |  | After aging | 101 | 89 | 12 | 3/8 | 0.13 | 1.8 | 12.0 |
| Comparative example IE 1.8 g/cm³ | 150°C/16 h | Before aging | 83 | 75 | 8 | 4/5 | 0.11 | / | / |
|  |  | After aging | 45 | 42 | 3 | 2/3 | 0.07 | 16.8 | 42.6 |

| Examples | Aging conditions | Test conditions | AV (mPa·s) | PV (mPa·s) | YP (Pa) | YP/PV Pa/mPa·s | FL (API) (mL) | FL (HTHP) (mL) |
|---|---|---|---|---|---|---|---|---|
| Example 1D | 150° C./16 h | Before aging | 92 | 71 | 21 | 0.30 | / | / |
|  |  | After aging | 83 | 70 | 13 | 0.19 | 2.2 | 10.6 |
| Comparative example 6A | 150° C./16 h | Before aging | 72 | 66 | 6 | 0.09 | / | / |
|  |  | After aging | 69 | 65 | 4 | 0.06 | 8.2 | 17.2 |
| Comparative example 6B | 150° C./16 h | Before aging | 130 | 112 | 18 | 0.16 | / | / |
|  |  | After aging | 116 | 99 | 17 | 0.17 | 5.6 | 13.8 |
| Comparative example 6C | 150° C./16 h | Before aging | 62 | 58 | 4 | 0.07 | / | / |
|  |  | After aging | 45 | 42 | 3 | 0.07 | 26.6 | 62.8 |
| Comparative example 6D | 150° C./16 h | Before aging | 76 | 67 | 9 | 0.13 | / | / |
|  |  | After aging | 68 | 63 | 5 | 0.08 | 6.6 | 16.0 |
| Comparative example 6E | 150° C./16 h | Before aging | 89 | 70 | 19 | 0.27 | / | / |
|  |  | After aging | 76 | 66 | 10 | 0.15 | 5.2 | 18.8 |

From the results, it can be seen that the drilling fluids provided by the invention have stable and good rheological and fluid loss performances before and after aging in a high-salt environment with NaCl content of 90 g; while the viscosity and the shearing force of the drilling fluids of the comparative examples are greatly reduced after aging at high temperature, and partial barite is precipitated, and the suspension capacity is far lower than that of the drilling fluids provided by the present invention with the same density; in addition, the fluid loss of the drilling fluids of the has a lower viscosity and dynamic shear force and a higher fluid loss; when the supramolecular shear-enhancing agent contained in the drilling fluid system is excessive (more than 12 g), the apparent viscosity and plastic viscosity of the drilling fluid are obviously increased, so that the fluidity of the drilling fluid is poor, and the improvement of the water power of the drill bit is not facilitated; when the drilling fluid system does not contain the supramolecular fluid loss additive, the fluid loss of the drilling fluid is greatly increased, and the viscosity and the shearing force are also obviously reduced; when the drilling fluid system does not contain the plugging agent, the obtained drilling fluid has larger filtration loss and reduced viscosity shear force, that is, in the present invention, the drilling fluid with stable and good rheological property and filtration loss property can be obtained by matching the supramolecular shear-enhancing agent, the supramolecular fluid loss additive and the plugging agent with specific contents and types with other components in the drilling fluid system.

Namely, the drilling fluid system provided by the invention has the unique properties of keeping the rheological property of the system stable and controlling the fluid loss by mutually matching the supramolecular shear-enhancing agent and the supramolecular fluid loss additive in the drilling fluid system, and can be matched with other components in the drilling fluid system, so that the drilling fluid with stable rheological property, stable fluid loss property and good performance can be obtained.

3. Evaluation of Shearing Recovery Rheology (Self-Assembly Characteristics) of Drilling Fluids The drilling fluid flows through the drill bit water hole with high shearing rate, after the grid structure is damaged, the performance of the space network structure is recovered in the annular space with lower shearing rate through self-assembly, namely the shearing recovery rheology. The change conditions of the elastic modulus of the drilling fluid in the high-strain and low-strain transformation processes are measured by using the HAAKE rheometer to evaluate the self-assembly capacity of the drilling fluid prepared in the above examples after high-temperature aging at 150° C., and the invention exemplarily provides the test results of part of examples, and the specific results are shown in FIG. 1.

In FIG. 1, the elastic modulus reflects the strength of the space network structure formed between the high molecular polymers or between the high molecular polymers and the colloidal particles in the viscoelastic fluid, and the high elastic modulus of the drilling fluid indicates that the network structure formed inside the drilling fluid has high strength and is more favorable for suspending and carrying debris.

As can be seen from FIG. 1, the elastic modulus of all three drilling fluids are below 0.2 Pa under high strain (high shear) conditions, indicating that their spatial network structure has been sufficiently destroyed. After the high strain process is over, the elastic modulus of the three drilling fluids entering the low strain (low shear) state begins to increase, indicating that the internal network structure begins to recover. The elastic modulus of the comparative drilling fluid 1# (Comparative example 2) increases more slowly under three low strain conditions, and never reaches a steady value, indicating that the shearing recovery performance is poor, that is, the "self-assembly" capability is the worst compared to the other 2 groups of drilling fluids. Comparative drilling fluid 2# (Comparative example 3) has a longer elastic modulus increase process in the first low strain region, and does not reach a steady state, and the time required for structure recovery is longer, and after entering the second and third low strain regions, the elastic modulus begins to stabilize after increasing for a period of time, indicating that the structure recovery to a relatively stable state takes a period of time, that is to say, the "self-assembly" capability is poor. In contrast, in the three low strain regions, the elastic modulus of the drilling fluids provided by the invention can be rapidly increased, the increasing process is the shortest, and the elastic modulus is rapidly increased to a stable state, so that the drilling fluids can be rapidly recovered after high strain and has stronger self-assembly capacity.

Meanwhile, it should be noted that even though the final elastic modulus of comparative drilling fluid 2# is higher than that of the drilling fluid provided by the present invention during the recovery process in the low shear region, the time taken for the comparative drilling fluid 2# to recover to a relatively stable elastic modulus is longer than that of Example 6, indicating that the comparative drilling fluid 2# has a relatively slow recovery process and the structure recovery or "self-assembly" capability far inferior to that of the drilling fluids provided by the present invention.

4. Evaluation of Rheological Properties Such as Extreme High Shear Rate Viscosity and Shear Dilution of Drilling Fluids The rheological properties of the drilling fluid are evaluated by using the Casson model, the extreme high shear rate viscosity $\eta_\infty$, the Casson dynamic shear force $\tau_c$ and the shear dilution coefficient $I_m$ of each drilling fluid are calculated respectively, and the test results of the following partial examples are provided exemplarily, and are specifically shown in Table 5.

TABLE 5

Casson rheological parameters of drilling fluid

| Examples | Aging conditions | Test conditions | $\eta_\infty$ (mPa.s) | $\tau_c$ (Pa) | $I_m$ |
|---|---|---|---|---|---|
| Example 7 no weight increase | 150° C./16 h | Before aging | 6.13 | 0.57 | 114.14 |
| | | After aging | 5.71 | 0.52 | 111.95 |
| Example 2 (1.3 g/cm³) | 150° C./16 h | Before aging | 20.09 | 1.90 | 115.12 |
| | | After aging | 20.04 | 1.83 | 111.58 |
| Example 3 (1.5 g/cm³) | 150° C/16 h | Before aging | 38.83 | 5.95 | 179.04 |
| | | After aging | 31.42 | 3.67 | 139.47 |
| Example 4 (1.8 g/cm³) | 150° C./16 h | Before aging | 58.31 | 11.99 | 235.32 |
| | | After aging | 44.05 | 8.13 | 212.71 |
| Example 5 (2.0 g/cm³) | 150° C./16 h | Before aging | 52.81 | 10.65 | 231.11 |
| | | After aging | 62.15 | 12.56 | 231.52 |
| Comparative example 1E (1.8 g/cm³) | 150° C./16 h | Before aging | 69.34 | 10.85 | 182.45 |
| | | After aging | 49.39 | 5.29 | 128.73 |
| Comparative example 4 no weight increase | 150° C./16 h | Before aging | 21.55 | 1.76 | 100.72 |
| | | After aging | 10.77 | 0.42 | 52.44 |

Note:
the extreme high shear rate viscosity $\eta_K$ can be approximately considered as the viscosity at the water hole of the drill bit, and the lower the value, the more favorable the rock breaking and the increase of the mechanical drilling speed; the Casson dynamic shear force $\tau_c$ represents the strength of the internal grid structure of the drilling fluid, and can reflect the rock carrying and suspending capacity of the drilling fluid; the shear dilution coefficient $I_m$ is used to characterize the strength of the shear dilutability of the drilling fluid, with the larger $I_m$ indicating the greater the shear dilutability.

As can be seen from Table 5, $\eta_\infty$ and $\tau_c$ tend to increase with increasing drilling fluid density, and furthermore, as the drilling fluid density increases, the requirement for suspension properties of the drilling fluid increases, and $\tau_c$ shows an increasing trend.

In particular, as can be seen by comparing Example 4 with Comparative example 1E, the $\eta_\infty$ of the drilling fluid of Example 4 is lower than that of Comparative example 1E before and after aging under the same density (1.8 g/cm³), and the Casson dynamic shear force $I_m$ and $\tau_c$ of Example 4 are higher than those of Comparative example 1E, which indicates that the drilling fluid provided by the invention not only has lower extreme high shear viscosity and better shear dilution, is beneficial to realizing high drill bit water power and improving jet drilling speed, but also has better suspension performance, can better carry debris and clean the well bore.

In particular, as can be seen by comparing Example 7 with Comparative example 4, the $\tau_c$ of Example 7 is slightly reduced after high-temperature aging at 150° C. under the condition of no weight increase, while the $\tau_c$ of Comparative example 4 is obviously reduced, which indicates the stable suspension capacity of the drilling fluid of the invention; in addition, the $\eta_\infty$ of Comparative example 4 is significantly higher than that of the drilling fluid of Example 7, and $I_m$ is lower than that of the drilling fluid of the invention, which shows that the drilling fluid provided by the invention has lower extreme high shear viscosity $\eta_\infty$ and stronger shear dilution, and is beneficial to improving the drilling efficiency.

5. Evaluation of Temperature Resistance, Inhibitive Performance and Anti-Pollution Performance of Drilling Fluids (1) Evaluation of Temperature Resistance The drilling fluids prepared in the above examples were tested for changes in rheological and fluid loss properties at high temperature during hot rolling for different times, respectively, and the present invention illustratively provides the test results of the following examples, and are specifically shown in Table 6.

TABLE 6

The changes of the basic properties of the drilling fluids with the hot rolling time

| Examples | hot rolling temperature (° C.) | hot rolling time (h) | AV (mPa·s) | PV (mPa·s) | YP (Pa) | $\Phi_6/\Phi_3$ | FL (API) (mL) | FL (HTHP) (mL) |
|---|---|---|---|---|---|---|---|---|
| Example 8 | 120 | 16 | 54 | 46 | 8 | 4/3 | 2.4 | 10.8 |
| | 120 | 48 | 45 | 36 | 9 | 4/2 | 2.2 | 14.2 |
| | 120 | 72 | 46 | 42 | 4 | 3/2 | 3.6 | 15.0 |
| Example 9 | 120 | 16 | 49 | 39 | 10 | 4/2 | 2.6 | 12.2 |
| | 120 | 48 | 52 | 42 | 10 | 3/2 | 2.8 | 10.2 |
| | 120 | 72 | 53 | 42 | 11 | 3/2 | 2.8 | 10.0 |

From the above, it can be seen that after the hot rolling from 16 h to 72 h, the viscosity and the shear force of the drilling fluid prepared in Example 8 are slightly reduced, and the performance of the drilling fluid is not damaged although the fluid loss is slightly increased; the viscosity and the shear force of the drilling fluid prepared in Example 9 are not reduced, and the fluid loss is not increased, which shows that the drilling fluid provided by the invention has excellent temperature resistance. Further, as can be seen from the comparison of the two results, increasing the content of the supramolecular treatment agent (such as supramolecular shear-enhancing agent and supramolecular fluid loss additive) in a certain range is beneficial to improving the temperature resistance of the drilling fluid system.

(2) Debris Rolling Recovery Rate

Figure 2:
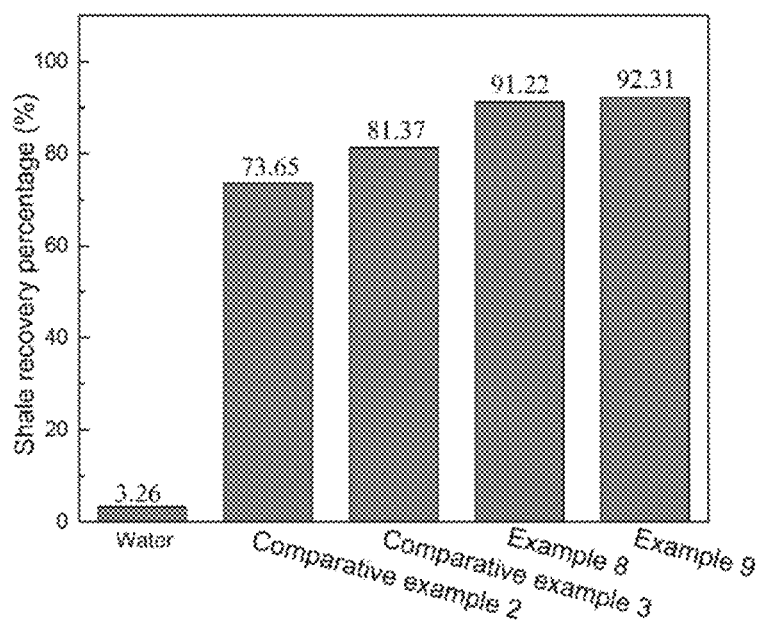
FIG. 2 is a graph comparing the results of rolling recovery rate of shale debris from the drilling fluids prepared in Examples 8-9 and Comparative examples 2-3.

The present invention has tested the mud shale debris rolling recovery rate of the drilling fluid prepared in the above examples, and compared it with that of clean water, and the present invention illustratively provides the test results of the following examples, with specific results being shown in FIG. 2.

As can be seen from FIG. 2, the rolling recovery rate of the drilling fluid provided by the present invention is above 90 wt %, higher than Comparative example 2 (73.65 wt %) and Comparative example 3 (81.37 wt %), and much higher than the rolling recovery rate of clean water (3.26 wt %).

In addition, after the hot rolling recovery, the particle state of debris in the drilling fluid of the invention still maintains a relatively complete morphology, which shows that the drilling fluid of the invention has good performance of inhibiting shale dispersion.

(3) Evaluation of Anti-Pollution Performance

The anti-pollution performance of the drilling fluid prepared in the following examples was tested by the present invention, and the specific results are shown in Table 7.

TABLE 7

Evaluation of anti-pollution performance of drilling fluids

| Examples | Pollution conditions | conditions | AV (mPa·s) | PV (mPa·s) | YP (Pa) | $\Phi_6/\Phi_3$ | FL(API) (mL) | FL(HTHP) (mL) |
|---|---|---|---|---|---|---|---|---|
| Example 8 1.55 g/cm³ | Before pollution | Before aging | 58 | 46 | 12 | 5/4 | 2.8 | / |
| | | After aging | 52 | 43 | 9 | 3/2 | 3.0 | 11.6 |
| | 10 wt % bentonite | Before aging | 82 | 70 | 12 | 9/8 | 2.2 | / |
| | | After aging | 73 | 63 | 10 | 5/4 | 2.6 | 10.2 |
| | 0.5 wt % CaCl₂ | Before aging | 56 | 45 | 11 | 4/3 | 3.0 | / |
| | | After aging | 45 | 42 | 3 | 2/1 | 3.6 | 11.8 |
| | 3 wt % sodium bicarbonate | Before aging | 60 | 49 | 11 | 4/3 | 2.6 | / |
| | | After aging | 50 | 42 | 8 | 4/2 | 3.2 | 10.2 |
| Comparative example 5 1.55 g/cm³ | Before pollution | Before aging | 66 | 58 | 8 | 4/3 | 3.0 | / |
| | | After aging | 52 | 45 | 7 | 3/2 | 3.6 | 12.8 |
| | 10 wt % bentonite | Before aging | 102 | 85 | 17 | 11/10 | 1.8 | / |
| | | After aging | 90 | 79 | 11 | 8/7 | 2.2 | 10.2 |
| | 0.5 wt % CaCl₂ | Before aging | 60 | 52 | 8 | 4/3 | 4.0 | / |

TABLE 7-continued

Evaluation of anti-pollution performance of drilling fluids

| Examples | Pollution conditions | conditions | AV (mPa · s) | PV (mPa · s) | YP (Pa) | $\Phi_6/\Phi_3$ | FL(API) (mL) | FL(HTHP) (mL) |
|---|---|---|---|---|---|---|---|---|
| | | After aging | 45 | 41 | 4 | 3/2 | 4.6 | 14.8 |
| | 3 wt % sodium bicarbonate | Before aging | 62 | 55 | 7 | 4/3 | 3.0 | / |
| | | After aging | 53 | 47 | 6 | 3/2 | 3.6 | 12.6 |

Note:
the aging conditions were 120° C. for 16 h.

It can be seen from Table 7 that the rheological and fluid loss properties of the drilling fluid of Example 8 and Comparative example 5 before and after contamination at the same density (1.55 g/cm³).

Specifically, after 10 wt % (based on water in the drilling fluid) of bentonite contamination, the apparent viscosity of the drilling fluid of Example 8 increased slightly, and the dynamic shear force and the $\Phi_6/\Phi_3$ reading did not substantially change after aging, indicating that 10 wt % bentonite invasion did not cause deterioration of the rheological properties of the drilling fluid; the apparent viscosity of the drilling fluid of the Comparative example 5 is greatly increased, and the reading of $\Phi_6/\Phi_3$ is also obviously increased, which indicates that the bentonite invasion resistance of the drilling fluid is limited;

furthermore, the fluid loss of the drilling fluid of Comparative example 5 increased after 0.5 wt % of CaCl₂ (based on water in the drilling fluid) contamination, and the performance of the drilling fluid of Comparative example 5 did not change significantly after 3 wt % of NaHCO₃ (based on water in the drilling fluid) contamination; after 0.5 wt % of CaCl₂ and 3 wt % of NaHCO₃ contamination, the rheological and fluid loss parameters of the drilling fluid provided by the invention are hardly changed obviously, which indicates that the drilling fluid provided by the invention has good anti-pollution performance.

6. Evaluation of Reservoir Protection Performance

The reservoir protection performance of the drilling fluid system is reflected by evaluating the permeability recovery value, and the invention provides the test results of the permeability recovery value of the drilling fluid to the rock core in the following examples, and the specific results are shown in Table 8.

TABLE 8

Permeability recovery of drilling fluid systems

| Examples | Core length (cm) | Core diameter (cm) | Core porosity (%) | Gas permeability (10⁻³ μm²) Before pollution | Gas permeability (10⁻³ μm²) After pollution | Permeability value (%) |
|---|---|---|---|---|---|---|
| Example 3 1.5 g/cm³ | 4.968 | 2.510 | 16.26 | 11.62 | 10.65 | 91.65 |
| Example 4 1.8 g/cm³ | 4.986 | 2.512 | 17.55 | 12.71 | 11.89 | 93.55 |
| Example 5 2.0 g/cm³ | 4.972 | 2.512 | 19.16 | 14.49 | 13.50 | 93.17 |

From the data in Table 8, it can be seen that the permeability recovery values of the drilling fluids with three different densities provided by the present invention are all greater than 90%, and good reservoir protection performance is shown.

In conclusion, the saturated salt water drilling fluid of salt response type intelligent polymer obtained by matching the specific content and variety of the supramolecular shear-enhancing agent, the supramolecular fluid loss additive and the plugging agent with other components in the drilling fluid system has the characteristics of salt response and self-assembly, can keep the rheological characteristics such as quick recovery of the structure after shearing, low extreme high shear rate viscosity, good shear dilution property and the like in a high-salt environment, and has good temperature resistance, pollution resistance and debris dispersion inhibition performance; meanwhile, it has good fluid loss reduction performance and reservoir protection performance.

In addition, the saturated salt water drilling fluid of salt response type intelligent polymer provided by the invention has excellent performance in a high-salt environment, provides a new idea for the development of salt-resistant polymers, and opens up a new direction for further improving the calcium resistance, high temperature resistance and other performances of the drilling fluid.

The preferred embodiments of the present invention have been described above in detail, but the present invention is not limited thereto. Within the scope of the technical idea of the present invention, many simple modifications can be made to the technical solution of the present invention, including various technical features being combined in any other suitable way, and these simple modifications and combinations should also be regarded as the disclosure of the present invention, and all fall within the scope of the present invention.

The invention claimed is:

1. A saturated salt water drilling fluid of salt response type intelligent polymer, wherein the drilling fluid consists of bentonite, NaOH, KCl, calcium carbonate, barite, NaCl, supramolecular fluid loss additive, supramolecular shear-enhancing agent, plugging agent, coating agent and water;

the supramolecular shear-enhancing agent is zwitterionic polyacrylamide; the supramolecular fluid loss additive contains structural unit A, structural unit B and structural unit C; the structural unit A is a structural unit with the structure shown in formula (1); the structural unit B is a structural unit with the structure shown in formula (2); the structural unit C is a structural unit with the structure shown in formula (3); the weight average molecular weight of the supramolecular fluid loss additive is 50000 to 500000;

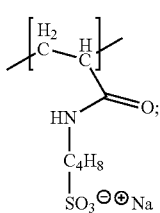

formula (1)

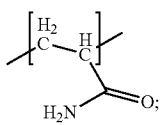

formula (2)

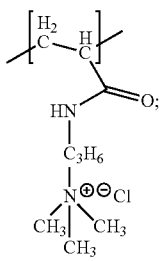

formula (3)

wherein the bentonite is contained in an amount of 1-6 parts by weight relative to 100 parts by weight of water; the content of the NaOH is 0-3 parts by weight; the content of the KCl is 0-8 parts by weight; the content of the calcium carbonate is 0-8 parts by weight; the content of the barite is 0-180 parts by weight; the content of the supramolecular fluid loss additive is 0.1-4 parts by weight; the content of the supramolecular shear-enhancing agent is 0.1-4 parts by weight; the content of the plugging agent is 2-6 parts by weight; the content of the NaCl is 0-36 parts by weight; the content of the coating agent is 0-0.8 wt %.

2. The drilling fluid according to claim 1, wherein the bentonite is contained in an amount of 1-4 parts by weight relative to 100 parts by weight of water; the content of the NaOH is 0-1.5 parts by weight; the content of the KCl is 0-5 parts by weight; the content of the calcium carbonate is 0-4 parts by weight; the content of the barite is 0-180 parts by weight; the content of the supramolecular fluid loss additive is 0.5-3.5 parts by weight; the content of the supramolecular shear-enhancing agent is 0.5-3 parts by weight; the content of the plugging agent is 2-4 parts by weight; the content of the NaCl is 0-36 parts by weight; and/or the content of the coating agent is 0.2-0.8 wt %.

3. The drilling fluid according to claim 1, wherein the drilling fluid is selected from at least one of the following drilling fluids;

drilling fluid 1: the drilling fluid contains two or more of the following components stored in admixture or separately: bentonite, NaOH, KCl, calcium carbonate, barite, NaCl, supramolecular fluid loss additive, supramolecular shear-enhancing agent, plugging agent and water;
  wherein the bentonite is contained in an amount of 1-4 parts by weight relative to 100 parts by weight of water; the content of the NaOH is 0.1-1.5 parts by weight; the content of the KCl is 1-5 parts by weight; the content of the calcium carbonate is 1-4 parts by weight; the content of the barite is 0-180 parts by weight; the content of the supramolecular fluid loss additive is 0.5-3.5 parts by weight; the content of the supramolecular shear-enhancing agent is 0.5-3 parts by weight; the content of the plugging agent is 2-4 parts by weight; and/or the content of the NaCl is 0-36 parts by weight;

drilling fluid 2: the drilling fluid contains two or more of the following components stored in admixture or separately: bentonite, NaCl, supramolecular fluid loss additive, supramolecular shear-enhancing agent, plugging agent and water;
  wherein the bentonite is contained in an amount of 1-4 parts by weight relative to 100 parts by weight of water; the content of the supramolecular fluid loss additive is 0.5-3.5 parts by weight; the content of the supramolecular shear-enhancing agent is 0.5-3 parts by weight; the content of the plugging agent is 2-4 parts by weight; and/or the content of the NaCl is 0-36 parts by weight;

drilling fluid 3: the drilling fluid contains two or more of the following components stored in admixture or separately: bentonite, NaOH, calcium carbonate, barite, NaCl, supramolecular fluid loss additive, supramolecular shear-enhancing agent, plugging agent, water and coating agent;
  wherein the bentonite is contained in an amount of 1-4 parts by weight relative to 100 parts by weight of water; the content of the NaOH is 0.1-1.5 parts by weight; the content of the calcium carbonate is 1-4 parts by weight; the content of the barite is 0-180 parts by weight; the content of the supramolecular fluid loss additive is 0.5-3.5 parts by weight; the content of the supramolecular shear-enhancing agent is 0.5-3 parts by weight; the content of the plugging agent is 2-4 parts by weight; the content of the NaCl is 0-36 parts by weight; and/or the content of the coating agent is 0.2-0.8 wt %; and drilling fluid 4: the drilling fluid contains two or more of the following components stored in admixture or separately: bentonite, NaOH, KCl, calcium carbonate, barite, NaCl, supramolecular fluid loss additive, supramolecular shear-enhancing agent, plugging agent, coating agent and water;
  wherein the bentonite is contained in an amount of 1-4 parts by weight relative to 100 parts by weight of water; the content of the NaOH is 0.1-1.5 parts by weight; the content of the KCl is 1-5 parts by weight; the content of the calcium carbonate is 1-4 parts by weight; the content of the barite is 10-180 parts by weight; the content of the supramolecular fluid loss additive is 0.5-3.5 parts by weight; the content of the supramolecular shear-enhancing agent is 0.5-3 parts by weight; the content of the plugging agent is 2-4 parts by weight; the content of the NaCl is 0.1-36 parts by weight; and/or the content of the coating agent is 0.2-0.8 wt %.

4. The drilling fluid according to claim 1, wherein the content of the structural unit A in the supramolecular fluid loss additive is 5-30 wt %, based on the total weight of the supramolecular fluid loss additive; the content of the structural unit B is 40-90 wt %; and/or the content of the structural unit C is 5-30 wt %.

5. The drilling fluid according to claim 1, wherein the weight average molecular weight of the supramolecular fluid loss additive is 20-40 ten thousand.

6. The drilling fluid according to claim 1, wherein the plugging agent is selected from at least one of white asphalt, lignite and sulfonated asphalt.

7. The drilling fluid according to claim 1, wherein the coating agent is selected from at least one of hydrolyzed polyacrylamide and multi-polymer emulsion coating agent.

8. The drilling fluid according to claim 1, wherein the calcium carbonate has an average particle size of 1000-3000 mesh.

9. The drilling fluid according to claim 1, wherein the drilling fluid has a density of 1-3 $g/cm^3$.

10. The drilling fluid according to claim 1, wherein the drilling fluid has a density of 1.1-2 $g/cm^3$.

11. A method for preparing the saturated salt water drilling fluid of salt response type intelligent polymer according to claim 1, wherein the method comprising: mixing the components of the drilling fluid according to claim 1.

* * * * *